US006113481A

United States Patent [19]

Ajima

[11] Patent Number: 6,113,481
[45] Date of Patent: Sep. 5, 2000

[54] JIG FOR USE IN WASHING OPTICAL ELEMENTS

[75] Inventor: Hiroaki Ajima, Omiya-machi, Japan

[73] Assignees: Fuji Photo Optical Co., Ltd., Omiya; Mito Fuji Koki Co., Ltd., Naka-gun, both of Japan

[21] Appl. No.: 09/277,747

[22] Filed: Mar. 29, 1999

[30] Foreign Application Priority Data

Mar. 31, 1998 [JP] Japan .................................. 10-101844

[51] Int. Cl.[7] ........................................ B23Q 1/08

[52] U.S. Cl. ..................... 451/364; 451/384; 269/289 R; 269/304

[58] Field of Search .............................. 451/50, 364, 365, 451/384, 386, 390, 391, 403, 404; 269/289 R, 304, 900

[56] References Cited

U.S. PATENT DOCUMENTS

| | | | |
|---|---|---|---|
| 1,500,485 | 7/1924 | Bruhl | 451/50 X |
| 4,655,164 | 4/1987 | Nelson et al. | 269/900 X |
| 4,928,939 | 5/1990 | Bell et al. | 269/900 X |
| 5,257,775 | 11/1993 | Burns | 269/289 X |
| 5,501,436 | 3/1996 | Miller | 269/289 X |

*Primary Examiner*—David A. Scherbel
*Assistant Examiner*—Anthony Ojini
*Attorney, Agent, or Firm*—Oblon, Spivak, McClelland, Maier & Neustadt, P.C.

[57] ABSTRACT

A jig for use in washing optical elements. The jig is arranged to receive and hold a plural number of optical elements, which are formed by polishing and cutting into predetermined unit lengths a plural number of glass rods adhesively fixed on a polishing tray, and then heating the polishing tray to kill adhesive power of an adhesive agent bonding the optical elements to the polishing tray. The jig is in the form of a pallet which is constituted by a base member and a cover member of similar grid-like forms, which are closable one on the other in an overlapped state and fixable to each other to form therebetween rows of nesting pockets for securely holding therein rows of optical elements in the same positional relations as on said polishing tray. The base and cover member of the pallet are provided with openings on the opposite sides of the nesting pockets to bring the respective optical elements into contact with a cleaning liquid.

5 Claims, 8 Drawing Sheets

JIG FOR USE IN WASHING OPTICAL ELEMENTS

BACKGROUND OF THE INVENTION

1. Field of the Art

This invention relates to the manufacture of optical glass elements of predetermined shape from elongated glass rods, and more particularly to a jig for use in washing optical glass elements which are obtained by polishing glass rods and cutting same into predetermined unit lengths for optical elements.

2. Prior Art

Manufacturing processes of optical glass elements such as cylindrical lenses, for example, usually include polishing and cutting stages. More specifically, after polishing surfaces of elongated glass rods to a predetermined profile or curvature, the polished glass rods are cut into unit lengths for optical elements to be produced. A polishing tray 1 as shown in FIG. 8 is usually employed in these operational stages. The polishing tray 1 is formed of stainless steel and provided with a plural number of parallel rows of rod holder blocks 3 of inverted T-shape in cross section to support thereon glass rod 4, each in a space between adjacent rows of rod holder blocks 3. The glass rods 4 are supported on the rod holder blocks 3 while surfaces of the respective glass rods 4 are being polished. Each row of the rod holder blocks 3 has a length which is substantially the same as or larger than that of the glass rod 4, and the spacings between the adjacent rows of the support blocks 3 substantially conform with the width of the glass rods 4. The height of the rod holder blocks 3 is smaller than the thickness of the glass rods 4.

The glass rods 4 on the above-described polishing tray 1 must be held in a fixed state to prevent spontaneous movements during a polishing operation. For this purpose, as indicated in phantom in FIG. 8, the lower side of each glass rod 4 which is seated on stepped land portions 3*a* of the holder blocks 3 is fixedly bonded to the latter by the use of wax of the like. After the polishing operation, the glass rods 4 are cut into unit lengths at positions as indicated by broken lines in FIG. 8 according to dimensions of ultimate optical products. For cutting the glass rods 4 on the polishing tray 1, a number of cutting slits 5 are provided in the rod holder members 3 at predetermined intervals in the longitudinal direction. These cutting slits 5 are cut into the rod holder ridges 3 from upper side and at least to a depth in level with the stepped land portions 3*a*.

After polishing and cutting the glass rods 4, the optical elements come out with smudged or dusty surfaces bearing polishing powder or dust of removed material in addition to spots of wax or an adhesive which was used for fixation of glass rods 4. Accordingly, it is the general practice to wash the optical elements by ultrasonic cleaning subsequent to the shaping process, thereby getting rid of the adhesive or other organic substances. For this purpose, it becomes necessary to transfer the shaped optical elements on the polishing tray to a washing rack or the like. In order to separate and remove the optical elements from the polishing tray 1, the adhesive power of the adhesive agent, which was used in fixing the glass rods 4 to the polishing tray in the cutting stage, is destroyed before the transfer by heating the polishing tray 1 on a hot plate to a temperature at which the adhesive agent is melt down and fused. Then, the optical elements are picked up from the polishing tray one after another and put on a jig for a washing or cleaning operation. In so doing, it has been the usual practice to pick up and transfer optical elements manually by the use of tweezers or pincer of bamboo or other soft-touching tool which would not damage the optical elements.

However, since the glass rods on the polishing tray have been cut into a large number of units of optical elements, this job of transferring optical elements manually one by one in that manner is extremely troublesome and time consuming. Especially, for enhancing the efficiency of the manufacturing process, each polishing tray is constructed in a compact form and arranged to carry as many glass rods as possible. Therefore, the glass holder ridges which intervene the respective glass rods are very small in width or thickness, and optical elements on the polishing tray are arrayed densely with only a small spacing between adjacent optical elements. Accordingly, meticulous skill is required for picking up optical elements by inserting tweezers into narrow spacings, making the job more difficult and troublesome.

In addition, the adhesive is used for fixing glass rods on a polishing tray tentatively and should not have such a strong adhesive power as to make it difficult to remove optical elements in a later stage. Therefore, the reaction forces which act on the respective glass rods in the polishing and cutting stages should be born not by the adhesive but by the vertical walls of the glass holder ridges in contact with the opposite sides of the glass rods. For this purpose, the glass holder ridges are required to have a sufficient height, which is a little short of the top side of the glass rods. This gives rise to another problem that only limited surface areas on lateral sides of each optical elements are accessible by tweezers or the like, making it difficult to hold the optical element stably on tweezers when picking it up from a polishing tray. Consequently, there are many possibilities of the optical elements slipping off or being dropped off when picked up from the polishing tray or while in transfer therefrom. Since optical glass elements are fragile, they can be fractured or damaged easily even by slight impact.

SUMMARY OF THE INVENTION

In view of the foregoing situations, it is an object of the present invention to provide a jig for use in washing optical elements, which permits to relocate polished optical elements in a secure manner from a polishing tray to a washing pallet to be used in a washing stage subsequent to a polishing stage.

It is another object of the present invention to provide a jig of the sort as mentioned above, permitting to transfer and relocate all the optical elements on a polishing tray to a washing pallet in a quick and safe manner without using tweezers, pincers or the like.

It is still another object of the present invention to provide a jig of the sort as mentioned above, employing a washing pallet which permits to wash clean substantially uniformly all of optical elements irrespective of positions on the pallet.

It is a further object of the present invention to provide a jig of the sort as mentioned above, employing a washing pallet which can hold optical elements thereon in such a way as to permit easy eye inspection in checking the optical elements for a defect or flaws in a stage subsequent to a cleaning stage.

In accordance with the present invention, for achieving the above-stated objectives, there is provided a jig for use in washing optical elements, said jig being arranged to receive and hold a plural number of optical elements, which are formed by polishing and cutting into predetermined unit lengths a plural number of glass rods adhesively fixed on a polishing tray, and then heating the polishing tray to kill the adhesive power of an adhesive agent which fixes the optical elements to the polishing tray. The jig according to the invention comprises: a pallet constituted by a base member and a cover member of similar grid-like forms, the base and cover members being closable one on the other in an overlapped state and fixable to each other to form therebetween rows of nesting pockets for securely holding therein a large number of optical elements in the same positional relations as on the polishing tray, and the base and cover member of the pallet having openings on the opposite sides of the nesting pockets for contacting the respective optical elements with a cleaning liquid.

In this instance, the openings in the base and cover members of the washing pallet are in the form of slots which are larger in length and partly smaller in width as compared with glass rods to be cut into individual optical elements. The base and cover members are provided with flat surfaces on the respective joining or meeting sides, along with detachable fixation means which is applicable to fix the base and cover members securely to each other. In a more particular preferred form of the present invention, the openings constituting nesting pockets on the side of the cover member have a greater depth as compared with thickness of the optical elements, and have a varying width which is larger than the width of the optical elements on the meeting side to be closed on said base member but smaller than the width of effective surface areas of the optical elements on the side away from the base member. Preferably, the cover member further includes a number of separator wires which are stretched transversely across the respective openings in the cover member at intervals corresponding to intervals of gap spaces between individual optical elements cut from glass rods, the separator wires having a smaller diameter as compared with the width of the gap spaces between the optical elements, so that the separator wires can get into and stay in the gap spaces with a play for a certain degree of movement when the base and cover members of the pallet are closed, while partitioning off the openings into separate nesting pockets for individual optical elements.

BRIEF DESCRIPTION OF THE DRAWINGS

The above and other objects, features and advantages of the present invention will become apparent from the following particular description of the invention, taken in conjunction with the accompanying drawings which show by way of example a preferred embodiment of the invention and in which.

DESCRIPTION OF PREFERRED EMBODIMENTS

Hereafter, the present invention is described more particularly by way of its preferred embodiments with reference to the accompanying drawings. Firstly, shown in FIG. 1 is the general layout of a washing jig according to the invention, and shown in FIG. 2 are base and cover members of the jig in a separated state.

Figure 8:
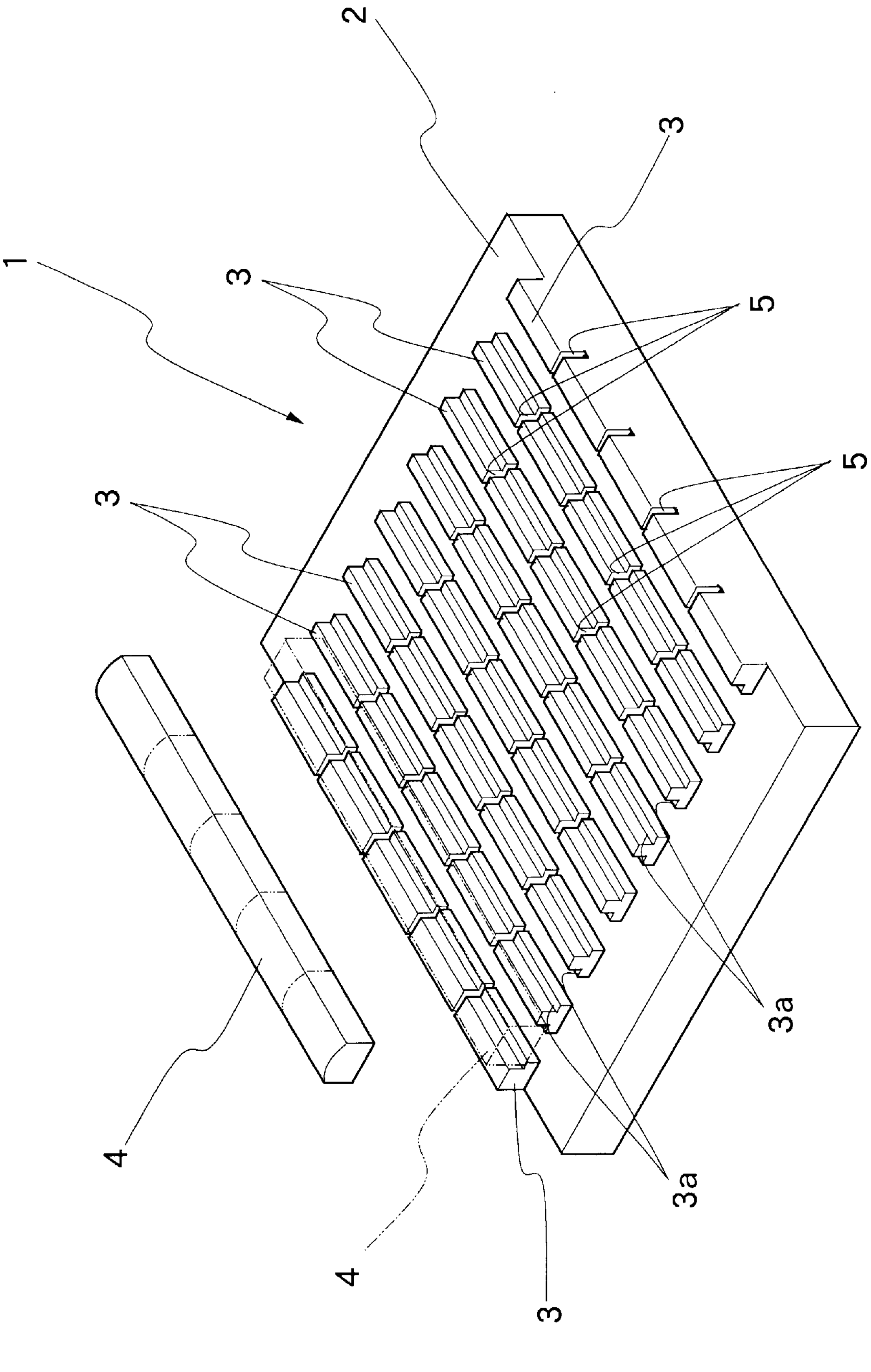
FIG. 8 is a schematic outer view of glass rods and a polishing tray.

The washing jig is used in ultrasonic cleaning of optical elements, which are obtained by cutting shaped and polished glass rods into unit lengths on a polishing tray as shown in FIG. 8. Up to this stage, the manufacturing process of the optical elements is well known in the art and therefore its description is omitted here.

Figure 1:
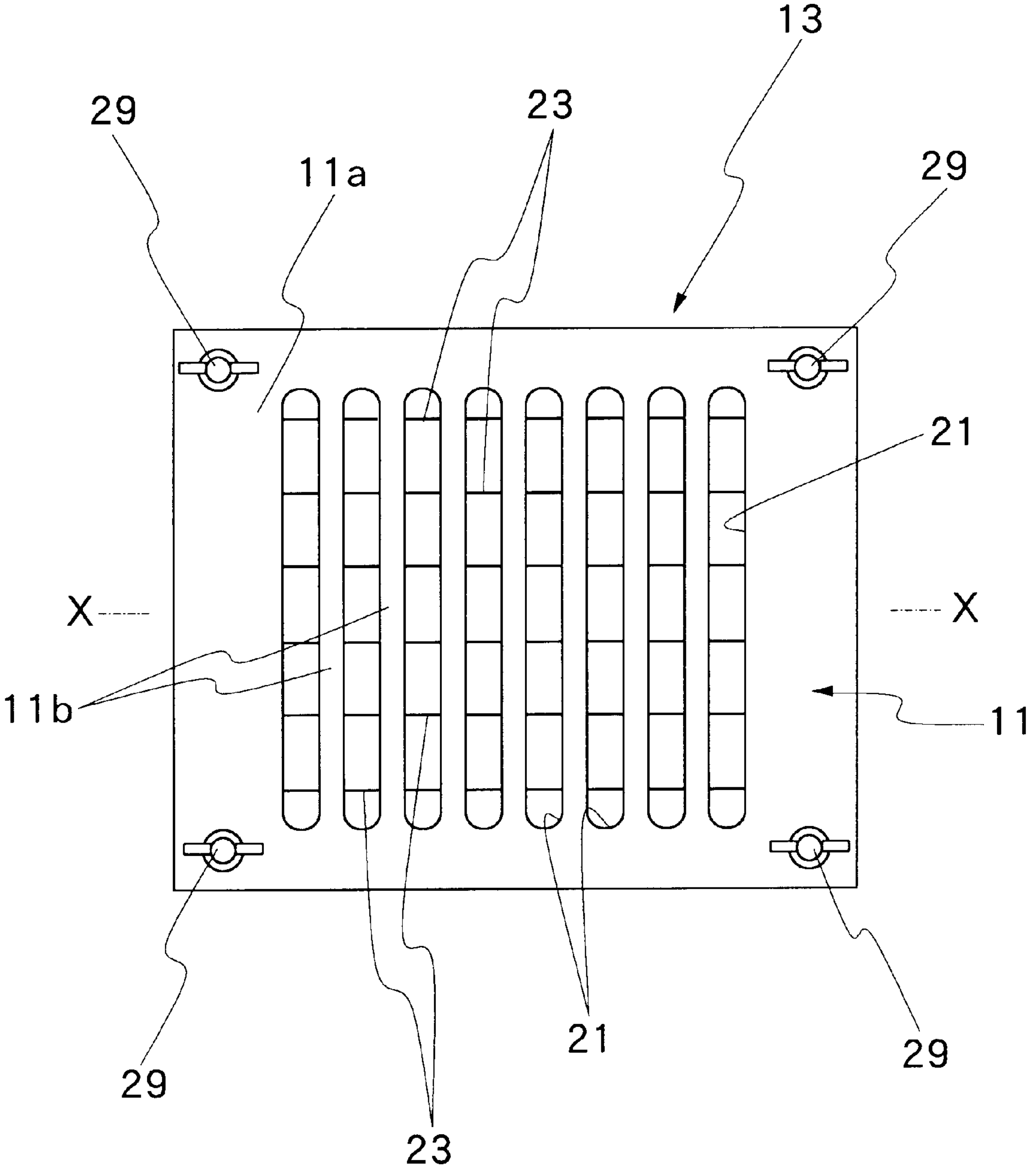
FIG. 1 is a schematic plan view of a washing pallet to be used as a jig in washing optical elements.
Figure 2:
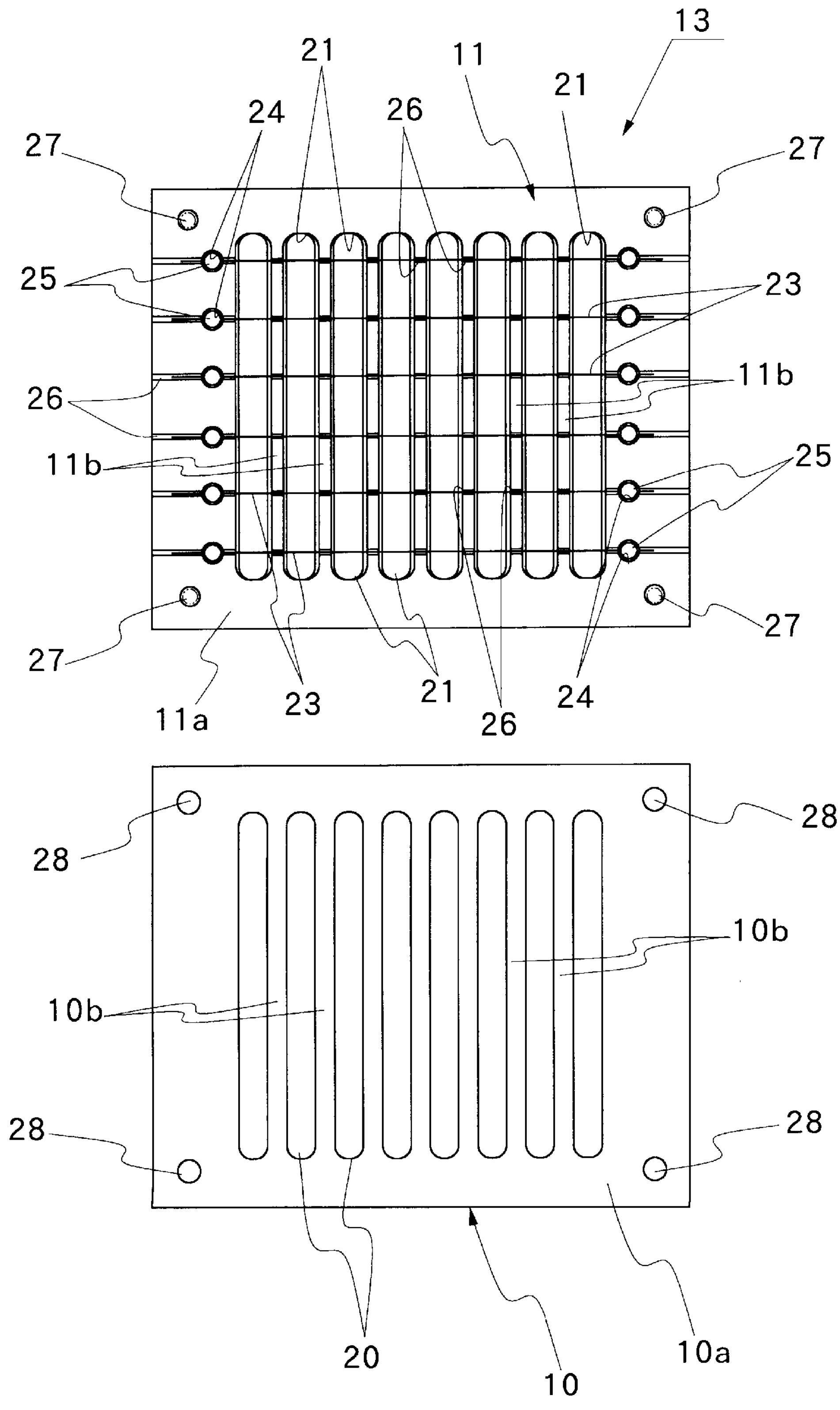
FIG. 2 is a schematic plan view of a base member and a cover member of the washing pallet, showing meeting or joining sides of the two members.
Figure 3:
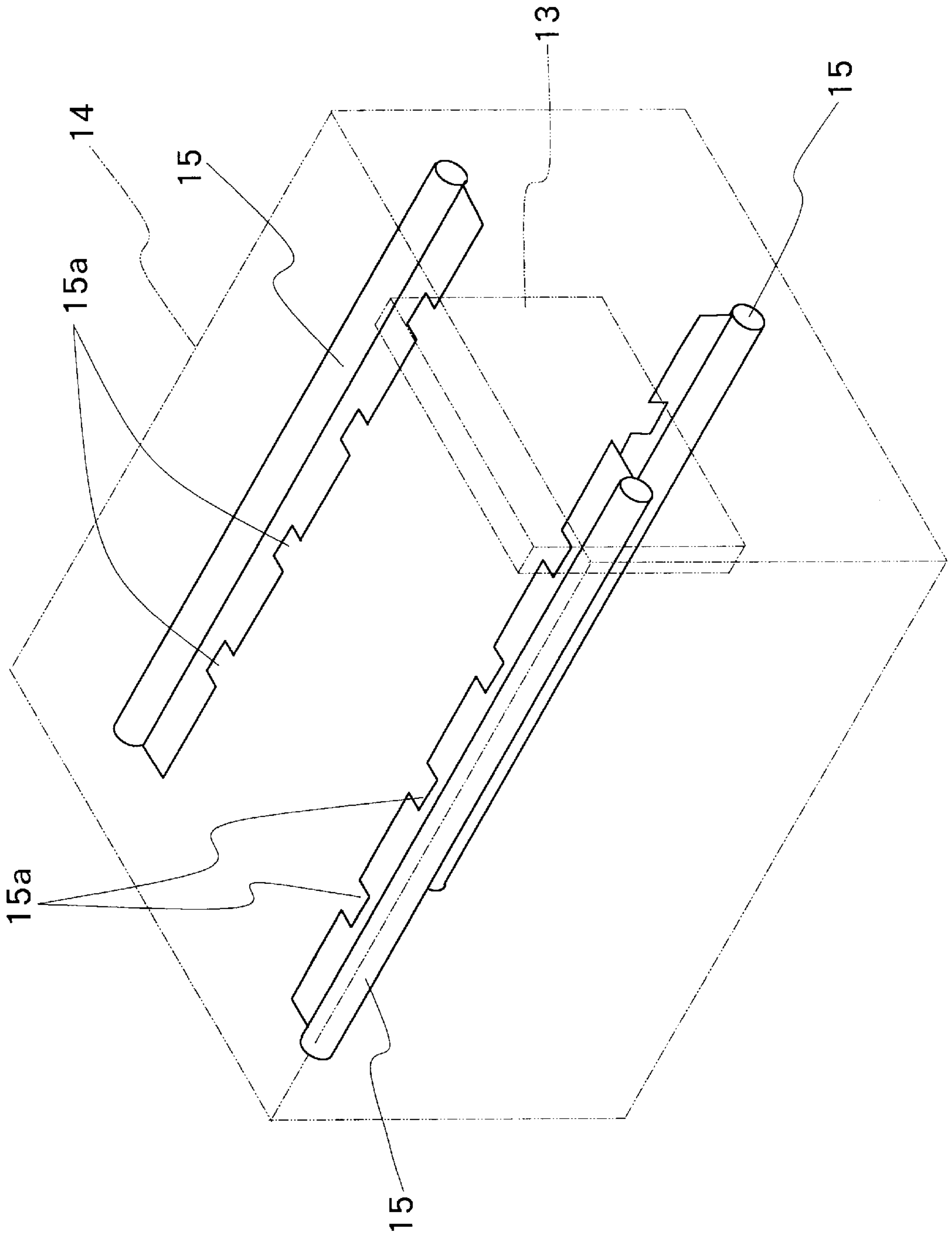
FIG. 3 is a schematic illustration of a washing rack which supports a number of washing pallets.

In FIGS. 1 and 2, indicated at 10 and 11 are base and cover members of similar grid-like shapes, respectively, which can be closed one on the other to hold a large number of optical elements 12 therebetween, constituting a washing pallet 13 which serves as a washing jig. Besides, optical elements 12 on a polishing tray 1, which is used in preceding polishing and cutting stages, can be transferred onto the washing pallet 13 without changing positional relations with each other, and, as shown particularly in FIG. 3, a plural number of similar washing jigs 13 are vertically set in spaced positions on a washing rack 14 by means of three positioning rods 15 with indented positioning portions at predetermined intervals. The washing rack 14 which is open at the opposite ends is immersed in an ultrasound cleaning bath to wash simultaneously a large number of optical elements on the washing pallets 13.

The base and cover members 10 and 11 are provided with frame portions **10*a* and 11*a* and slat portions 10*b* and 11*b*, respectively. Formed between the slat portions 10*b* and 11*b* of the base and cover members 10 and 11 are slots 20 and 21 which correspond to each other in position. The pitch or intervals between the slots 20 and 21 corresponds to the spacings between the glass rods 4 on the polishing tray 1, which are spaced apart by the glass holder ridges 3. The length of the slots 20 and 21 is substantially same as or slightly longer than the glass rods 4. On the other hand, the width of the slots 20 and 21 is partly smaller than that of the glass rods 4**.

Figure 4:
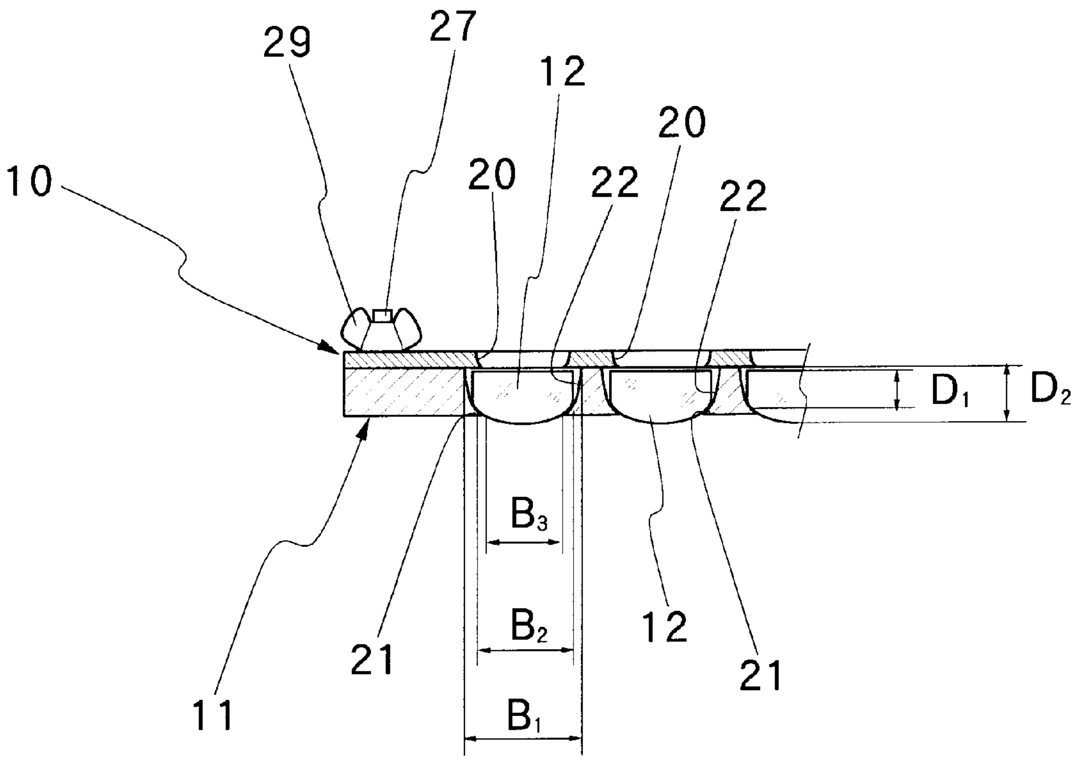
FIG. 4 schematic sectional view taken on line X—X of FIG. 1.

The base member 10 is formed in a flat shape, while the cover member 11 is provided with a large number of pockets 22 for nesting optical elements in an array or in rows and columns. More particularly, as shown in FIG. 4, the cover member 11 is provided with edges substantially of L-shape in section on the side facing toward the slots 21, and the respective slat portions **11*b* are formed substantially in T-shape in section. As a result, the slots 21 in the cover member 11, which have a larger width than the optical elements 12 on the inner side facing toward the base member 10, are gradually narrowed to have a smaller width than the optical elements 12 on the outer side facing away from the base member 10. Each slot which converges to the outer side of the cover member 11 accommodates a row of optical elements which have been cut from the same glass rod 4. Separator wires 23 are extended across the respective slots 21** at suitable intervals in the longitudinal direction to separate preceding and succeeding optical elements in each row from each other.

The separator wires 23 are metal wires of a diameter which is smaller than the width of gap spaces between preceding and succeeding optical elements 12 in the respective slots 21 and are each stretched in a tensioned state between paired stopper pins 25 which are opposingly threaded into grooves 24 provided in the frame portion **11*a* of the cover member 11. The slat portions 11*b* are similarly provided with grooves 26 transversely along the passages of the separator wires 23**.

Figure 5:
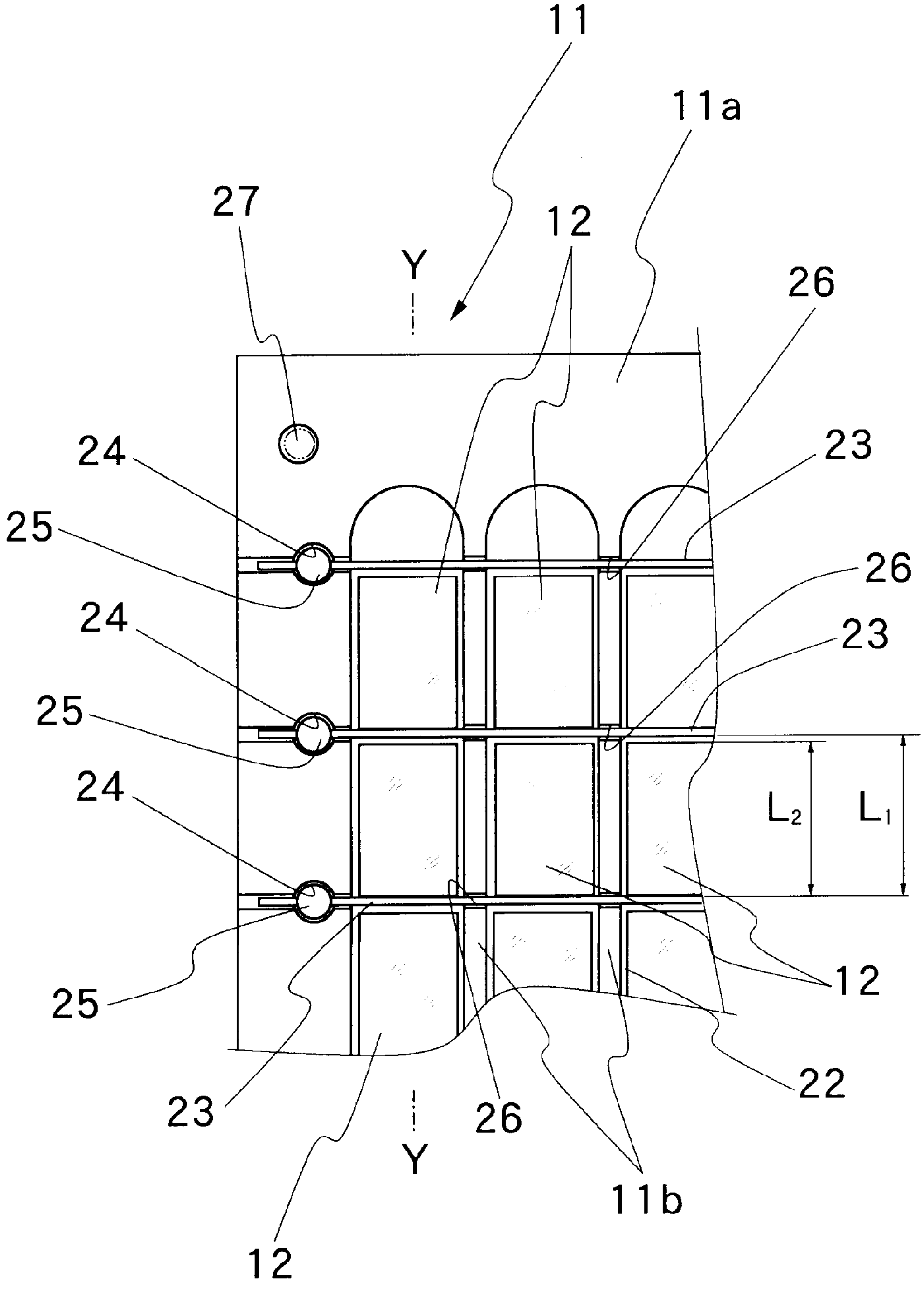
FIG. 5 is an enlarged fragmentary view of the cover member shown in FIG. 2, carrying transferred optical elements thereon.

Accordingly, a large number of nesting pockets 22 for the optical elements are defined in a matrix on the cover member 11 by the frame portions 11*a*, slat portions 11*b* and separator wires 23. As seen in FIGS. 4 and 5, the width $B_1$ of the nesting pockets 22 is slightly larger than the width $B_2$ of the optical elements 12, and the width $B_3$ of the slots 21 is slightly smaller than the width $B_2$ of the optical elements 12. However, the width $B_3$ of the slots 21 should be wider than the width of effective surface areas of the optical elements 12. On the other hand, the depth $D_1$ of the nesting pockets 22 is slightly larger than the thickness $D_2$ of the optical elements 12 in the vicinity of the opposite ends thereof. The nesting pockets 22 are formed in a length $L_1$ which is longer than the length $L_2$ of the optical elements 12 by a measure corresponding to the depreciation in length of the glass material which is chipped off in the preceding cutting stage. The diameter of the separator wires 23 is smaller than the width of gap spaces which are formed between preceding and succeeding optical elements 12 in the cutting stage. Further, as shown particularly in FIG. 6, the separator wires 23 in the gap spaces between the preceding and succeeding optical elements 12 in the nesting pockets 22 are positioned close to the rear side of the optical elements 12 to which an adhesive was applied.

The base member 10 and cover member 11 are then one on the other and fixed together in an overlapped state. For this purpose, the cover member 11 is provided with screw rods 27 in four corner of the frame portion 11*a* for engagement with apertures 28, which are bored opposingly in corresponding positions on the base member 10. Accordingly, as the screw rods 27 are inserted into the apertures 28, the base and cover members 10 and 11 are closed one on the other. These two members are fixed to each other by threading and tightening nuts 29 on projected ends of the screw rods 27. Instead of using screws, the base and cover members 10 and 11 may fixed to each other in the closed state by other fixation means, for example, by clamp means or the like.

With the arrangements as described above, it becomes possible to transfer all of optical elements 12 on a polishing tray 1 to the washing pallet 13 to wash them simultaneously by ultrasonic cleaning. Namely, when a polishing tray 1 is put on a hot plate to melt down or fuse off an adhesive, the inner side of the cover member 11, which is to be joined with the base member 10, is placed on the polishing tray 1 before melting the adhesive. Whereupon, the separator wires 23 of the nesting pockets 22 on the part of the cover member 11 are allowed to get into the gap spaces between preceding and succeeding ones in the rows of the optical elements 12 on the polishing tray 1. As a result, the respective rows of optical elements 12 are received in the nesting pockets 22 either between the slat portions 11*b* and the frame portion 11*a* or between two adjacent slat portions 11*b* of the cover member 11.

In that state, the polishing tray 1 which is closed by the cover member 11 on its upper side is turned upside down and then lifted up. Since the adhesive has been melt down to lose its adhesive power, the optical elements 12 remain on the side of the cover member 11 by gravity and are therefore separated from the lifted polishing tray 1. In this instance, if the polishing tray 1 is lifted straight in the upward direction, some optical elements 12 may remain stuck on the polishing tray 1 without being separated from the latter by gravity. Transfer failures of this sort can be prevented by moving the polishing tray 1 in the direction of the glass holder ridges 3 as it is lifted up. By so doing, the optical elements 12 are restrained of movements in the direction of the glass holder ridges 3 by the separator wires 23 and positively separated from the polishing tray 1 which is in movement in that direction. In this case, the respective optical elements can be handed over to the cover member 11 in a more assured manner. In this state, the base member 10 is closed on the cover member 11. The position of the base member 10 relative to the cover member 11 is automatically adjusted as the apertures 28 of the part of the base member 10 are engaged with the screw rods 27. Thereafter, the base and cover members 10 and 11 are fixed to each other by tightening the butterfly screws 29 on the screw rods 27. Thus, the optical elements 12 are now separately accommodated in the respective nesting pockets 22.

After transferring a predetermined number of optical elements to a suitable number of washing pallets 13 in the above-described manner, the loaded washing pallets 13 are put on the washing rack 14 side by side in spaced upright positions and immersed in an ultrasonic cleaning bath. The optical elements in the nesting pockets 22 of the pallets 13 are allowed to move slightly in limited ranges in upward and downward directions (or forward and rearward directions) as well as in lateral or sideward directions. Effective surface areas of the optical elements 12 are always located within the openings of the slots 20 and 21 of the base and cover members 10 and 11 of the pallets 13 and kept out of contact with structural parts of the base and cover members 10 and 11 and the separator wires 23 to preclude any possibility of scratching or other damages to the effective surfaces during an ultrasonic cleaning operation or at the time of handling the pallets 13 before and after ultrasonic cleaning.

Figure 6:
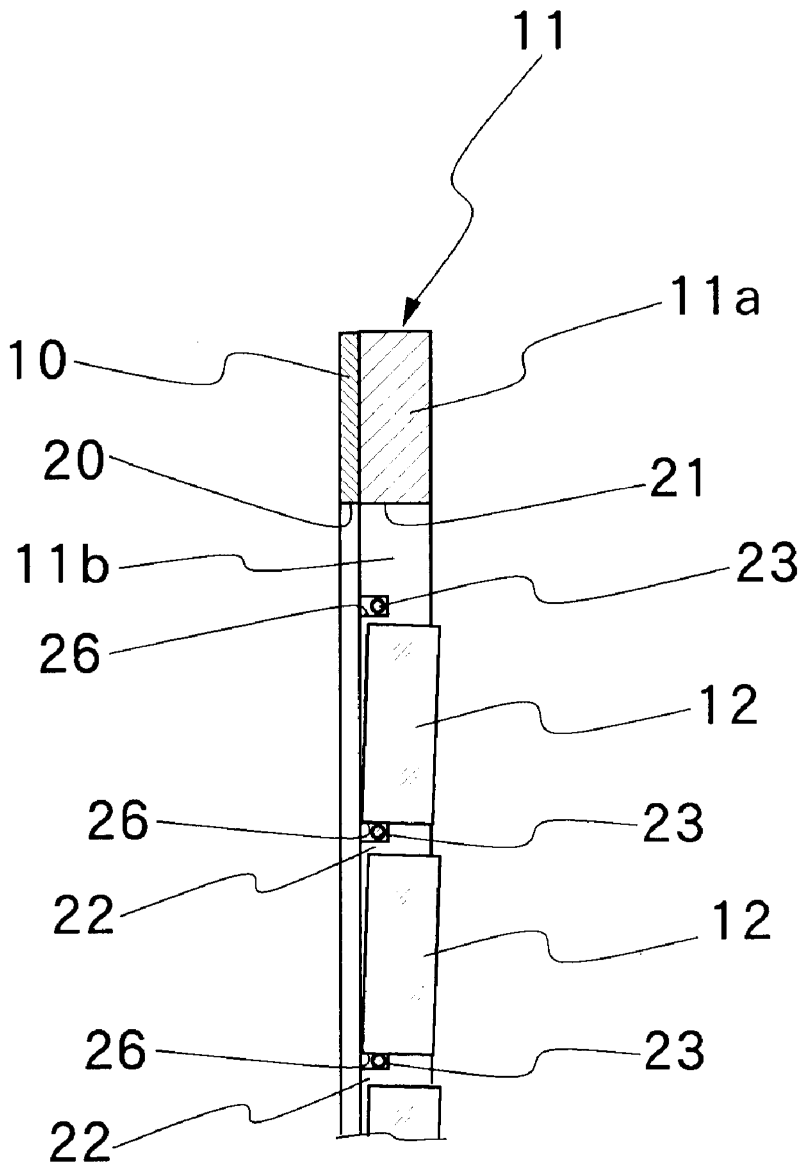
FIG. 6 is a schematic sectional view taken on line Y—Y of FIG. 5.

The washing rack 14 is immersed in an ultrasound cleaning bath for a predetermined time period to clean the optical elements 12. During this cleaning or washing operation, the surfaces of the optical elements 12 should be exposed as much as possible to hold substantially the entire surfaces in contact with a cleaning liquid. For this purpose, the surface areas which are in abutting contact with the base member 10, cover member 11 or separator wires 23 should be reduced to a minimum. In this regard, at least the effective surface areas of the optical elements 12, which are located within the openings of the slots 20 and 21, are invariably held in contact with an ultrasonically vibrated cleaning liquid to dissolve off organic contaminants like residues of an adhesive agent, if any, and to completely wash off dust or powdery contaminants or foreign matter such as dust of material which was removed or chipped off in polishing and cutting stages. Further, when the washing pallets 13 are in the upright position, the optical elements 12 are each abutted against a separator wire 23 at a position close to their rear side, so that, as shown in FIG. 6, the respective optical elements 12 are more or less inclined to the front side. Consequently, in addition to a lower end face which is in abutting contact with a separator wire 23, each optical element 12 comes into contact with the cover member 11 substantially at two points in upper opposite end portions thereof. Except for these three points, the surfaces of each optical element 12 remain in a free non-contacting state and can be washed thoroughly without forming traps for contaminant substances. Therefore, there is no possibility of trapped contaminant substances shifting to effective surface areas of the optical elements after a washing operation.

The ultrasonic cleaning is followed by drying of the washing pallets 13 as a whole, and then by inspection of the cleaned optical elements 12 firstly by eye observation. The checkpoints in this eye inspection include, for example, a check for cracks or other damages or flaws on the optical elements 12 and a check for cleanliness. For checking these points by eye inspection, it is the general practice to observe light rays which are transmitted through the optical elements 12, and this can be done even for the optical elements 12 which are still accommodated in the respective nesting pockets of the washing pallet 13 since light rays projected on one side of the pallet 13 are transmitted to the other side through the slots 20 and 21.

If there is a crack or a similar flaw, irregular light reflections occur at that point. On the other hand, the level of light transmission drops in those portions which are imperfect in cleanliness. Therefore, eye inspections in these aspects can be carried out quite smoothly. Besides, rather than an eye inspection observing the optical elements 12 individually one after another, it becomes possible to carry out the eye inspection more accurately because one can check each optical element 12 in comparison with other optical elements 12 which are located in adjacent positions on the upper, lower, right and/or left side.

If a flaw or defect is found in the course of the eye inspection, a disqualification mark is put on the defective optical element to distinguish the defective optical element from other qualified ones. A similar disqualification mark may be put on optical elements which have been disqualified because of imperfect cleaning, but a re-cleaning mark which is distinctively different from a normal disqualification mark may be put on such optical elements if desired. In case most of optical elements on a washing pallet 13 are found to be imperfect in cleanliness, the washing pallets as a whole can be returned to the cleaning stage to undergo washing again.

Figure 7:
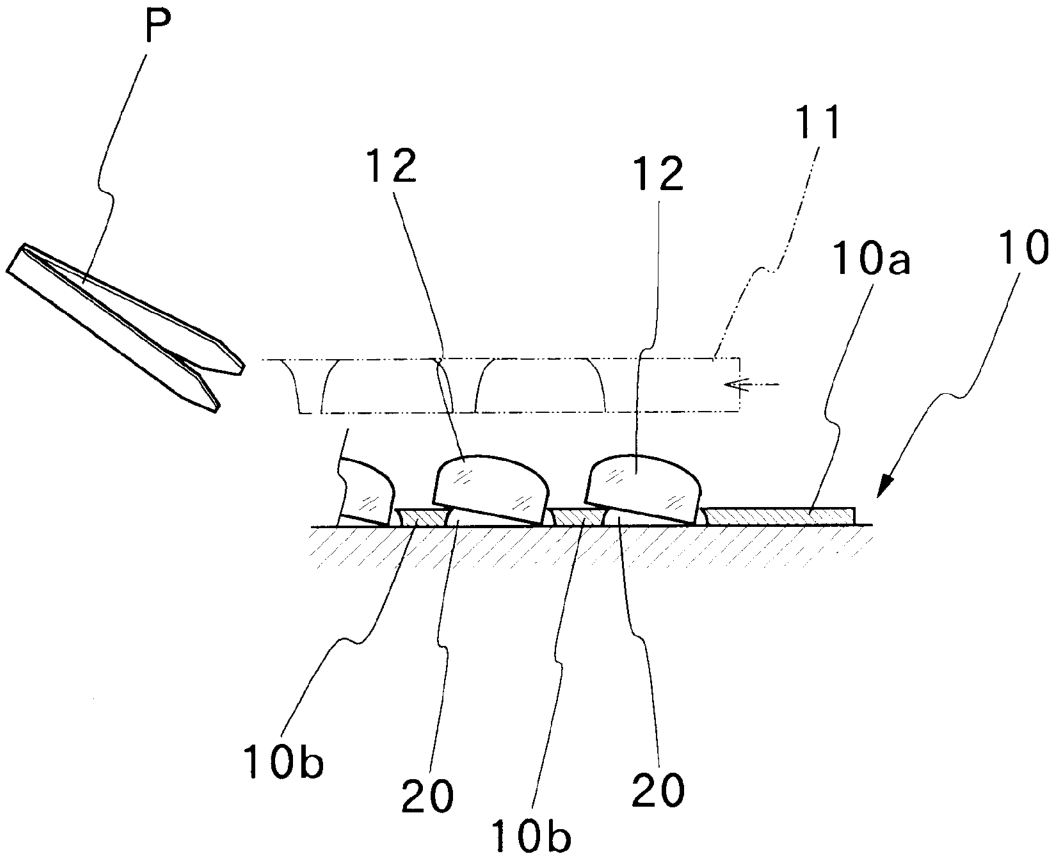
FIG. 7 is a schematic illustration of optical elements being picked up from the base member.

After an eye inspection, the optical elements 12 are unloaded from the washing pallet 13. At this time, with the base member 10 faced downward, the butterfly nuts 29 are unscrewed and removed. The cover member 11 is then separated from the base member 10 by lifting the cover member 11 in the upward direction. As the cover member 11 is lifted up, it is also shifted in the direction of the slat portions 10*b* of the base member 10 as indicated by an arrow in FIG. 7, urging the optical elements 12 to ride onto the slat portions 10*b* of the base member 10 at the respective side edge portions and to take a tilted posture. Accordingly, the optical elements 12 can now be picked up one after another quite smoothly by the use of bamboo tweezers P or the like.

Defective optical elements are ejected from the base member 11 while qualified optical elements are placed in a predetermined container type jig. At the same time, those optical elements 12 which have been found to be imperfect in cleanliness can be separated for re-cleaning. Subsequent to the cleaning and the post-cleaning inspection and the ejection of optical elements bearing a flaw or contaminants, the qualified optical elements 12 are transferred onto a container type jig. In transferring qualified optical elements or in ejecting defective or non-clean optical elements, they can be picked up smoothly in a secure state by the use of bamboo tweezers P or the like with the least possibilities of being dropped off because the respective optical elements 12 are completely exposed on four sides and are each in a tilted posture with one side edge portion thereof lying on a slat portion of the base member 10.

Further, when the glass rod 4 cut into unit lengths for the optical elements 12, a defect on the part of the cutting blade could cause cracking to edge portions of the optical elements 12. Therefore, the above-described eye inspection is important for spotting cracks of this nature and for replacing or fixing a defective cutting blade in an early stage as possible. Besides, at the time of eye inspection, the optical elements 12 on the base member 10 are exactly in the same positional relations with each other as they were in the cutting stage. Accordingly, from the position of a cracked optical element or elements, it is extremely easy to identify a defective cutting blade which needs to be fixed or replaced.

What is claimed is:

1. A jig for use in washing optical elements, said jig being arranged to receive and hold a plural number of optical elements, which are formed by polishing and cutting into predetermined unit lengths a plural number of glass rods adhesively fixed on a polishing tray, and heating said polishing tray to destroy adhesive power of an adhesive agent bonding said optical elements to said polishing tray, said jig comprising:

a pallet constituted by a base and a cover member, each of an open grid-like form, said base and cover members being closable one on the other in an overlapped state and fixable to each other to form therebetween rows of nesting pockets for securely holding therein said optical elements in the same positional relations as on said polishing tray, said base and cover members of said pallet being provided with openings on the opposite sides of said nesting pockets for accommodating said optical elements in an exposed state for contact with a cleaning liquid and providing window openings permitting passage of light rays from one to the other side of said pallet in a visual inspection stage subsequent to cleaning operation.

2. A jig as defined in claim 1, wherein said base and cover members of said pallet are provided with openings in the form of slots which are larger in length and partly smaller in width as compared with said glass rods.

3. A jig as defined in claim 1, wherein said base and cover members are provided with flat joining surfaces and detachable fixation means.

4. A jig as defined in claim 1, wherein said openings constituting said nesting pockets on the part of said cover member have a greater depth as compared with thickness of said optical elements, and have a varying width which is broader than said optical elements on the side to be closed with said base member but smaller than effective surface area of said optical elements on the side away from said base member.

5. A jig as defined in claim 4, further comprising a number of separator wires stretched transversely across said openings in said cover member at intervals corresponding to intervals of gap spaces between individual optical elements cut into unit lengths on said polishing tray, said separator wires having a smaller diameter as compared with width of said gap spaces between said optical elements and being able to get into and stay in said gap spaces with a play for a certain degree of movement when said base and cover members of said washing pallet are closed one on the other, while partitioning off said openings into separate nesting pockets for individual ones of said optical elements.

* * * * *